(12) United States Patent
Aydin et al.

(10) Patent No.: US 12,201,121 B2
(45) Date of Patent: Jan. 21, 2025

(54) PRODUCTION OF SOFT CONFECTIONERY BY MEANS OF ADDITIVE PROCESS WITH A NOZZLE AND SOFT CONFECTIONERY OBTAINABLE THEREBY

(71) Applicant: Rem3dy Health Limited, Birmingham (GB)

(72) Inventors: Bülent Aydin, Bocholt (DE); Bastian Fassin, Emmerich (DE); Dirk Ossenbrink, Kleve (DE)

(73) Assignee: Rem3dy Health Limited, Birmingham (GB)

( * ) Notice: Subject to any disclaimer, the term of this patent is extended or adjusted under 35 U.S.C. 154(b) by 867 days.

(21) Appl. No.: 15/543,136

(22) PCT Filed: Jan. 13, 2016

(86) PCT No.: PCT/EP2016/050585
§ 371 (c)(1),
(2) Date: Jul. 12, 2017

(87) PCT Pub. No.: WO2016/113318
PCT Pub. Date: Jul. 21, 2016

(65) Prior Publication Data
US 2018/0020691 A1    Jan. 25, 2018

(30) Foreign Application Priority Data

Jan. 13, 2015 (DE) .................... 10 2015 000 088.8
Aug. 21, 2015 (DE) .................... 10 2015 010 791.7
Aug. 24, 2015 (DE) .................... 10 2015 010 823.9

(51) Int. Cl.
*A23G 3/34* (2006.01)
*A23G 3/02* (2006.01)
(Continued)

(52) U.S. Cl.
CPC ......... *A23G 3/0242* (2013.01); *A23G 3/0021* (2013.01); *A23G 3/36* (2013.01);
(Continued)

(58) Field of Classification Search
CPC ...... A23G 3/0021; A23G 3/0242; A23G 3/50; A23G 3/36; A23G 3/44; A23G 3/42; B33Y 80/00
(Continued)

(56) References Cited

U.S. PATENT DOCUMENTS 5,641,529 A    6/1997  Kunas
6,213,174 B1 *  4/2001  Cook .................... G01G 13/06
                                                141/1
(Continued)

FOREIGN PATENT DOCUMENTS

CN    102669377    *  9/2012
DE    1218861 A       6/1966
(Continued)

OTHER PUBLICATIONS

German Patent & Trademark Office Examination Report dated Sep. 23, 2015, pp. 1-11.
(Continued)

*Primary Examiner* — Vera Stulii
(74) *Attorney, Agent, or Firm* — Taft Stettinius & Hollister LLP

(57) ABSTRACT

The present invention relates to a process for producing a soft candy, the process comprising as process steps
a) providing a soft-candy precursor composition characterized by a water content in a range from 15 to 24% by weight, based on the soft-candy precursor composition; and
b) shaping the soft-candy precursor composition by means of a nozzle having an outlet opening by over-
(Continued)

Figure 1:
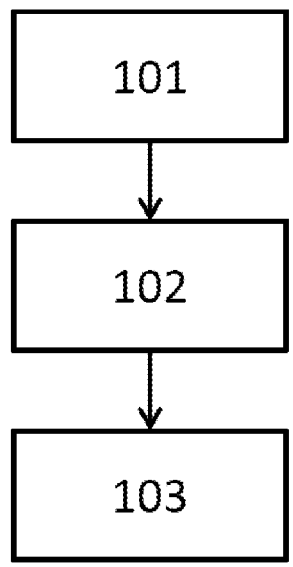

900 laying a substrate with the soft-candy precursor composition to obtain a shaped article,
the outlet opening of the nozzle traveling a three-dimensional trajectory;
the process further comprising a hardening of the shaped article to obtain a soft candy. The invention further relates to a soft candy obtainable by the process; a device comprising a soft-candy precursor composition; a process for producing a soft candy using the device; the use of the device; and the use of a soft-candy precursor composition.

10 Claims, 9 Drawing Sheets

(51) Int. Cl.
  *A23G 3/36* (2006.01)
  *A23G 3/42* (2006.01)
  *A23G 3/44* (2006.01)
  *A23G 3/50* (2006.01)
  *B33Y 80/00* (2015.01)
  *A23P 20/25* (2016.01)
(52) U.S. Cl.
  CPC ............... *A23G 3/42* (2013.01); *A23G 3/44* (2013.01); *A23G 3/50* (2013.01); *B33Y 80/00* (2014.12); *A23P 2020/253* (2016.08)
(58) Field of Classification Search
  USPC ........................................................ 99/450.1
  See application file for complete search history.

(56) References Cited

U.S. PATENT DOCUMENTS

| | | | |
|---|---|---|---|
| 2005/0260317 A1* | 11/2005 | Cotten | ............... A23G 3/0068 |
| | | | 426/516 |
| 2007/0231427 A1 | 10/2007 | Ream | |
| 2012/0321750 A1 | 12/2012 | Klene | |

FOREIGN PATENT DOCUMENTS

| | | |
|---|---|---|
| DE | 20 2014 001005 U1 | 4/2014 |
| WO | 9734500 A1 | 9/1997 |

OTHER PUBLICATIONS

European Patent Office, International Search Report, Apr. 5, 2016, pp. 1-5 including English translation.
European Patent Office, Written Opinion of the International Searching Authority, Apr. 5, 2016 pp. 1-12, including translation.
Canadian Office Action, Canadian Patent Office, Canadian Application No. 2,972,674, Nov. 9, 2023, 4 pages.
Kamozawa et al., The anatomy of a marshmallow, Popular Science, Nov. 26, 2008, https://www.popsci.com/diy/article/2008-11/anatomy-marshmallow/.
Syral, Tereos, Een nieuwe glucosestroop met technologische voordelen (A new glucose syrup with technological advantages), Mar. 2013.
Canadian Office Action, Canadian Intellectual Property Office, Canadian Patent Application No. 2,972,674, Feb. 13, 2023, 3 pages.
Canadian Office Action, Canadian Patent Office, Canadian Application No. 2,972,674, Oct. 11, 2024, 5 pages.

* cited by examiner

100

100

300

300

Figure 6
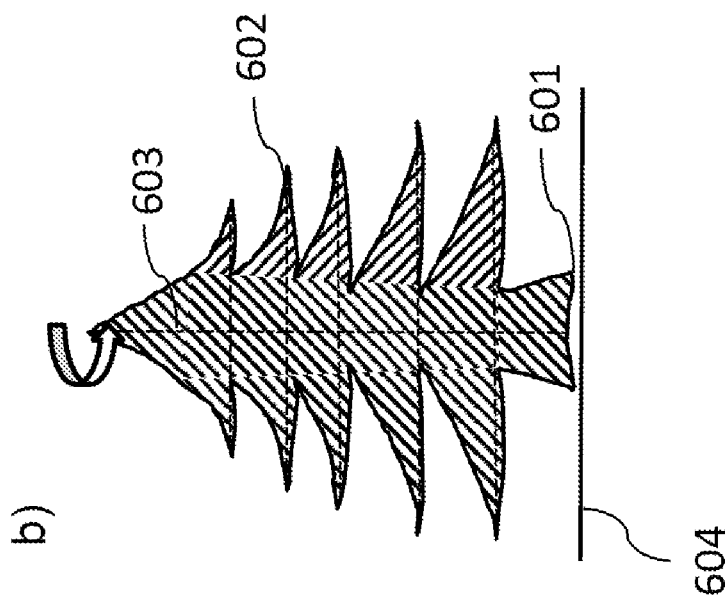
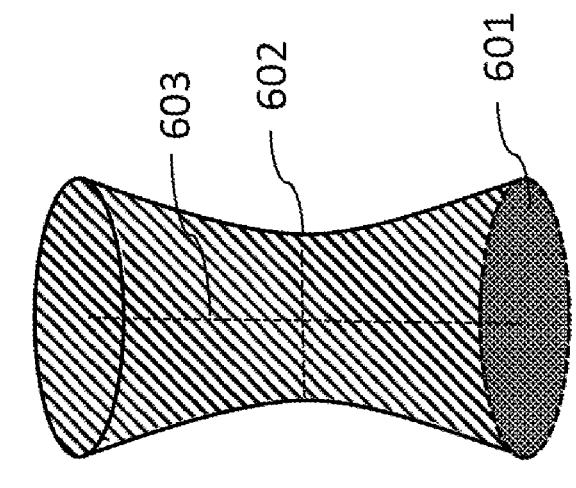

Figure 7
300
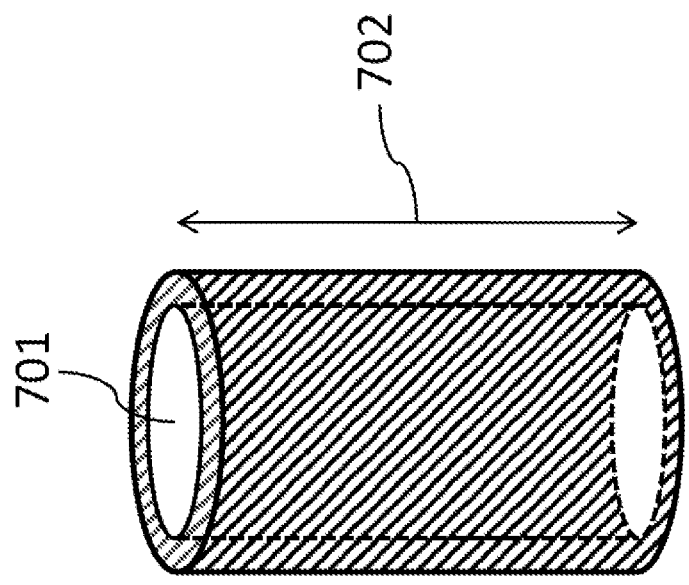
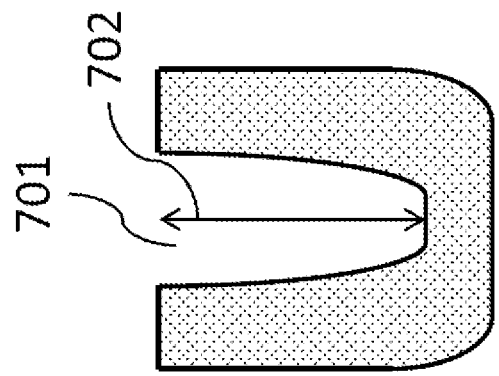
b)
a)

300

604

PRODUCTION OF SOFT CONFECTIONERY BY MEANS OF ADDITIVE PROCESS WITH A NOZZLE AND SOFT CONFECTIONERY OBTAINABLE THEREBY

CROSS REFERENCE TO RELATED APPLICATIONS

The present application is a U.S. national stage of, and claims the priority benefit of, International Patent Application Serial No. PCT/EP2016/050585, filed Jan. 13, 2016, and also claims the priority benefit of German Patent Application Serial No. 10 2015 000 088.8, filed Jan. 13, 2015, German Patent Application Serial No. 10 2015 010 791.7, filed Aug. 21, 2015, and German Patent Application Serial No. 10 2015 010 823.9, filed Aug. 24, 2015, the text and drawings of which are hereby incorporated by reference in their entireties.

The invention relates to a process for producing a soft candy, the process comprising as process steps
  a) providing a soft-candy precursor composition characterized by a water content in a range from 15 to 24% by weight, based on the soft-candy precursor composition; and
  b) shaping the soft-candy precursor composition by means of a nozzle having an outlet opening by overlaying a substrate with the soft-candy precursor composition to obtain a shaped article,
the outlet opening of the nozzle traveling a three-dimensional trajectory;
the process further preferably comprising a hardening of the shaped article to obtain a soft candy. The invention further relates to a soft candy obtainable by the process; a device comprising a soft-candy precursor composition; a process for producing a soft candy using the device; use of the device; and use of a soft-candy precursor composition.

Confectionery, especially soft candies, is an indulgence food that is widespread and generally liked. One way of producing soft candies that is fundamentally known in the prior art comprises pouring a liquid precursor composition into a negative mold. Examples of soft candies are fruit gums, wine gums, toffees and chewy candies.

For the production of fruit gums, it is also known in the prior art to pour the fruit gum composition into a negative mold formed from a cornstarch powder. In this connection, the negative mold has been pressed into the cornstarch powder by a punch as positive mold. To this end, the cornstarch powder is situated in a powder box. The fruit gums are demolded by flipping over the powder box. The following disadvantages arise in this prior-art process. The negative mold shaped by the punch is not dimensionally stable. Especially in the period between the shaping of the negative mold and the pouring of the fruit gum composition, it can be altered or destroyed or both. Moreover, demolding may be unsuccessful. There is a limited variety of shapes of the soft candies producible using the above-described pouring process. In particular, the soft candies produced according to this process always comprise a base area which, after the pouring into the mold, is exposed surface of the precursor composition. In many cases, attempts are made to model the shape of a soft candy on a real object such as a fruit or an animal. Success thereof is frequently only unsatisfactory owing to the production process for the soft candies. In many cases, what are obtained are more relief-type projections of the real object. Furthermore, in the conventional production process, a proportion of the cornstarch powder forming the negative mold can remain sticking to the confectionery. If said proportion is excessively large, this can have an excessively huge impact on the fruit gum in terms of visual appearance or taste or both. Furthermore, DE-AS-1 218 861 discloses a process in which there is generation of a strand which is then cut into the individual candies. Shaping is thus achieved by cutting.

In general, it is an object of the present invention to at least partially overcome a disadvantage arising from the prior art. It is an object of the invention to provide a soft candy having a greater variety of shapes. It is an object of the invention to provide a process for producing a soft candy without a negative mold.

It is further an object of the invention to provide fruit gums or soft candies and precursor compositions and also a process for producing said fruit gums or soft candies, wherein the soft candies or fruit gums can be preferably produced for immediate eating.

It is also an object of the invention to provide fruit gums or soft candies and precursor compositions and also a process for producing said fruit gums or soft candies, wherein the soft candies or fruit gums can be preferably produced in a decentralized manner at the site of their consumption.

It is further an object of the invention to provide fruit gums or soft candies and precursor compositions and also a process for producing said fruit gums or soft candies, wherein the soft candies or fruit gums can be preferably produced without having to package or wax them before eating.

It is further an object to specify compositions, a device, and a process allowing the production of soft candies or fruit gums without long drying and/or cooling times and without the great expenditure in terms of apparatuses and energy that is associated therewith in an industrial manufacturing process.

A contribution to at least partially achieving at least one of these objects is made by the independent claims. The dependent claims provide preferred embodiments which contribute to at least partially achieving at least one of the objects.

A contribution to at least partially achieving one of the objects of the invention is made by an embodiment 1 of a process 1 for producing a soft candy, the process comprising as process steps
  a) providing a soft-candy precursor composition characterized by a water content in a range from 15 to 24% by weight, preferably from 16 to 23% by weight, more preferably from 17 to 22% by weight, based in each case on the soft-candy precursor composition; and
  b) shaping the soft-candy precursor composition by means of a nozzle having an outlet opening (902) by overlaying a substrate with the soft-candy precursor composition to obtain a shaped article,
the outlet opening of the nozzle traveling a three-dimensional trajectory.

An inventive embodiment 2 of the process 1 is one according to embodiment 1, wherein the process further comprises a hardening of the shaped article to obtain a soft candy. A preferred hardening is a drying process.

An inventive embodiment 3 of the process 1 is one according to embodiment 1 or 2, wherein the provision of the soft-candy precursor composition in process step a) comprises the substeps:
  i) providing a base composition; and
  ii) contacting the base composition with an acid to obtain the soft-candy precursor composition.

An inventive embodiment 4 of the process 1 is one according to embodiment 1, 2 or 3, wherein the provision of the soft-candy precursor composition in process step a) comprises the substeps:
A) providing a foundation composition;
B) providing an acid composition; and
C) contacting the foundation composition with an acid composition to obtain the soft-candy precursor composition;

the foundation composition and the acid composition being contacted in a weight ratio from 1:2 to 2:1, preferably in a weight ratio in a range from 1:1.5 to 1.5:1 and particularly preferably in a weight ratio in a range from 1:1.1 to 1.1:1.

In the context of one configuration of this embodiment, it is preferred that the contacting is done at a temperature below 110° C. Preferably, the contacting is done in a temperature range from 15 to 70° C. and particularly preferably in a temperature range from 25 to 55° C. and also further preferably in a temperature range from 35 to 45° C. Furthermore, it is preferred according to the invention that there is a period of less than 240 sec, preferably of less than 120 sec, further preferably of less than 60 sec, additionally preferably less than 30 sec and particularly preferably less than 10 sec, between the start of the contacting according to substep A) and the completion of process step b) with the presence of the soft-candy precursor composition.

An inventive embodiment 5 of the process 1 is one according to embodiment 4, wherein the foundation composition comprises a polysaccharide, the polysaccharide content of the foundation composition being at least 10% by weight, preferably at least 20% by weight and particularly preferably at least 90% by weight, above the polysaccharide content in the acid composition. In one configuration of this embodiment, the acid composition is polysaccharide-free. What has been stated above applies as a separate configuration of this embodiment to any individual polysaccharide mentioned hereinafter.

An inventive embodiment 6 of the process is one according to embodiment 4 or 5, wherein the acid composition comprises an acid, the acid content of the acid composition being at least 10% by weight, preferably at least 50% by weight and particularly preferably at least 90% by weight, above the acid content of the foundation composition. In one configuration of this embodiment, the foundation composition is acid-free. What has been stated above applies as a separate configuration of this embodiment to any individual acid mentioned hereinafter.

An inventive embodiment 7 of the process 1 is one according to any of embodiments 4, 5 or 6, wherein the foundation composition has a foundation composition viscosity and the acid composition has an acid composition viscosity, foundation composition viscosity being in a range from 50 to 150%, preferably in a range from 75 to 125% and particularly preferably in a range from 90 to 110%, of the acid composition viscosity. The viscosity is preferably measured at a temperature of 40° C.

An inventive embodiment 8 of the process 1 is one according to embodiment 3 or 4, wherein the contacting in substep ii) or in substep C) is effected not more than 10 minutes, preferably not more than 8 minutes, more preferably not more than 5 minutes, before process step b) in each case.

An inventive embodiment 9 of the process 1 is one according to embodiment 3 or 4, wherein the acid is an organic acid.

An inventive embodiment 10 of the process 1 is one according to any of the preceding embodiments, wherein, in process step a), the soft-candy precursor composition comprises a polysaccharide in a range from 1.2 to 2.5% by weight, preferably from 1.5 to 2.3% by weight, more preferably from 1.8 to 2.1% by weight, based in each case on the weight of the soft-candy precursor composition. Preferably, the base composition comprises the same polysaccharide as the soft-candy precursor composition.

An inventive embodiment 11 of the process 1 is one according to any of the preceding embodiments, wherein, in process step a), the soft-candy precursor composition comprises a polypeptide in a range from 1 to 10% by weight, preferably from 2 to 8% by weight, more preferably from 3 to 7% by weight, most preferably from 3 to 6% by weight, based in each case on the weight of the soft-candy precursor composition.

An inventive embodiment 12 of the process 1 is one according to any of the preceding embodiments, wherein the soft-candy precursor composition is characterized by a pH in a range from 3.0 to 4.5, preferably from 3.2 to 4.2, more preferably from 3.3 to 4.0, additionally preferably from 3.4 to 3.9 and further preferably from 3.5 to 3.7.

An inventive embodiment 13 of the process 1 is one according to any of the preceding embodiments, wherein the soft-candy precursor composition in process step b) is characterized by a temperature in a range from 45 to 95° C., preferably from 50 to 90° C., more preferably from 55 to 80° C., more preferably from 55 to 75° C., more preferably from 55 to 70° C., most preferably from 60 to 66° C.

An inventive embodiment 14 of the process 1 is one according to any of the preceding embodiments, wherein the outlet opening has an opening area in a range from 0.1 to 3 mm$^2$, preferably from 0.3 to 3 mm$^2$, more preferably from 0.4 to 1.7 mm$^2$, more preferably from 0.5 to 1.2 mm$^2$.

An inventive embodiment 15 of the process 1 is one according to any of the preceding embodiments, wherein the soft-candy precursor composition is dispensed in portions from the outlet opening in at least two portions, preferably in at least 3 portions, more preferably in at least 4 portions, more preferably in at least 5 portions, most preferably in at least 10 portions, during the traveling of the three-dimensional trajectory. Preferably, a movement of the outlet opening along the three-dimensional trajectory is effected over time between the dispensing of, in each case, two portions of the soft-candy precursor composition from the outlet opening.

An inventive embodiment 16 of the process 1 is one according to any of the preceding embodiments, wherein a distance between the substrate and the outlet opening increases monotonically along the three-dimensional trajectory. The distance increases monotonically when it increases or remains constant in each step along the trajectory and it increases altogether in all steps along the trajectory.

An inventive embodiment 17 of the process 1 is one according to any of embodiments 2 to 16, wherein the hardening of the soft-candy precursor composition comprises a temperature adjustment of the soft-candy precursor composition to a temperature in a range from 10 to 40° C., preferably from 20 to 35° C., more preferably from 25 to 30° C., for a duration in a range from 0.1 to 120 minutes, preferably from 1 to 60 minutes, more preferably from 5 to 30 minutes. Here, any combination of the aforementioned preferred ranges of the duration and of the temperature is in each case a preferred configuration of the process.

An inventive embodiment 18 of the process 1 is one according to any of the preceding embodiments, wherein, in process step b), the traveling by the outlet opening is driven by an actuator or a motor or by both. A preferred motor is a stepper motor.

An inventive embodiment 19 of the process 1 is one according to any of the preceding embodiments, wherein, in process step b), the traveling by the outlet opening, or a dispensing of the soft-candy precursor composition from the outlet opening, or both is effected under computer control.

An inventive embodiment 20 of the process 1 is one according to embodiment 19, wherein the traveling by the outlet opening under computer control, or the dispensing of the soft-candy precursor composition from the outlet opening under computer control, or both is effected according to electronically stored data concerning a soft candy.

An inventive embodiment 21 of the process 1 is one according to embodiment 20, wherein the electronically stored data comprise a model of the soft candy. A preferred model is a computer model.

An inventive embodiment 22 of the process 1 is one according to embodiment 21, wherein the model is a CAD model.

A contribution to at least partially achieving one of the objects of the invention is made by an embodiment 1 of a soft candy 1, the soft candy being obtainable by the process 1 according to any of embodiments 1 to 22.

A contribution to at least partially achieving one of the objects of the invention is made by an embodiment 1 of a soft candy 2, the soft candy comprising a wall, the wall being characterized by a wall thickness in a range from 0.5 to 4 mm, preferably from 0.5 to 3 mm, more preferably from 0.5 to 2 mm.

An inventive embodiment 2 of the soft candy 2 is one according to embodiment 1, wherein the wall at least partly surrounds an interior.

An inventive embodiment 3 of the soft candy 2 is one according to embodiment 2, wherein the interior is characterized by a volume of at least 0.5 cm$^3$, preferably of at least 1 cm$^3$, more preferably of at least 3 cm$^3$.

An inventive embodiment 4 of the soft candy 2 is one according to embodiment 2 or 3, wherein the interior comprises a support structure. A preferred support structure is designed to support the wall of the soft candy. The support structure is designed to stabilize a shape of the soft candy. To this end, the support structure can comprise support struts. A preferred support structure consists of a material of which also at least a portion of the remaining soft candy consists.

An inventive embodiment 5 of the soft candy 2 is one according to any of embodiments 1 to 4, wherein the wall comprises at least one, preferably at least 2, more preferably at least 3, more preferably at least 5, most preferably at least 10, opening(s).

An inventive embodiment 6 of the soft candy 2 is one according to embodiment 5, wherein the opening is characterized by a width in a range from 0.5 to 3 mm, preferably from 1 to 3 mm, more preferably from 2 to 3 mm. Here, the width of the opening is the greatest extent of the opening along a line in an opening plane.

A contribution to at least partially achieving one of the objects of the invention is made by an embodiment 1 of a soft candy 3, the soft candy comprising a base area, the soft candy being characterized by a diameter in a plane parallel to the base area, a dependence of a length of the diameter on a position on a line perpendicular to the base area being describable by a diameter function, the diameter function being a nonmonotonic function.

An inventive embodiment 2 of the soft candy 3 is one according to embodiment 1, wherein the diameter function comprises at least 2 maxima, preferably at least 3 maxima, more preferably at least 4 maxima. A preferred maximum is a global maximum or a local maximum. Particular preference is given to a local maximum.

A contribution to at least partially achieving one of the objects of the invention is made by an embodiment 1 of a soft candy 4, the soft candy comprising a hole, the hole having a depth of at least 3 mm, preferably of at least 4 mm, more preferably of at least 5 mm, more preferably of at least 7 mm, most preferably of at least 10 mm.

An inventive embodiment 2 of the soft candy 4 is one according to embodiment 1, wherein the hole is a tunnel, the depth being a length of the tunnel through the soft candy.

An inventive embodiment 3 of the soft candy 4 is one according to embodiment 1, wherein the hole is an indentation.

A contribution to at least partially achieving one of the objects of the invention is made by an embodiment 1 of a soft candy 5, a total surface of the soft candy not being overlaid with flour to an extent of more than 0.05% by weight, preferably to an extent of more than 0.03% by weight, more preferably to an extent of more than 0.01% by weight, based in each case on the weight of the soft candy.

An inventive embodiment 2 of the soft candy 5 is one according to embodiment 1, wherein the total surface of the soft candy is not overlaid with starch to an extent of more than 0.05% by weight, preferably to an extent of more than 0.03% by weight, more preferably to an extent of more than 0.01% by weight, based in each case on the weight of the soft candy.

An inventive embodiment 3 of the soft candy 5 is one according to embodiment 1 or 2, wherein the total surface of the soft candy is not overlaid with cornstarch to an extent of more than 0.05% by weight, preferably to an extent of more than 0.03% by weight, more preferably to an extent of more than 0.01% by weight, based in each case on the weight of the soft candy.

A contribution to at least partially achieving one of the objects of the invention is made by an embodiment 1 of a soft candy 6, the soft candy not comprising a base area.

According to one aspect of the invention, the soft candies 1 to 6 are each preferred configurations of the invention through combinations with one another. Here, the embodiments of the respective soft candies 1 to 6 likewise form preferred embodiments of the particular combination of the soft candies 1 to 6. By way of example: soft candy 1 in combination with soft candy 5 and embodiment 2 of soft candy 5; soft candy 4 in combination with soft candy 5 and embodiment 3 of soft candy 5, soft candy 5 in combination with soft candy 2 and embodiment 2 of soft candy 2.

A contribution to at least partially achieving one of the objects of the invention is made by an embodiment 1 of a device 1 for producing a soft candy, the device comprising a nozzle which comprises an outlet opening and a soft-candy precursor composition;

the soft-candy precursor composition being characterized by a water content in a range from 15 to 24% by weight, preferably from 16 to 23% by weight, more preferably from 17 to 22% by weight, based in each case on the soft-candy precursor composition;

the nozzle
   a. being arranged above a substrate, and
   b. being designed and arranged such that the outlet opening can be moved to any point of a three-dimensional working volume above the substrate.

An inventive embodiment 2 of the device 1 is one according to embodiment 1, wherein the soft-candy precursor composition in the nozzle comprises a polysaccharide in a range from 1.2 to 2.5% by weight, preferably from 1.5 to 2.3% by weight, more preferably from 1.8 to 2.1% by weight, based in each case on the weight of the soft-candy precursor composition.

An inventive embodiment 3 of the device 1 is one according to embodiment 1 or 2, wherein the soft-candy precursor composition in the nozzle comprises a polypeptide in a range from 1 to 10% by weight, preferably from 2 to 8% by weight, more preferably from 3 to 7% by weight, most preferably from 3 to 6% by weight, based in each case on the weight of the soft-candy precursor composition.

An inventive embodiment 4 of the device 1 is one according to any of embodiments 1 to 3, wherein the soft-candy precursor composition is characterized by a pH in a range from 3.0 to 4.5, preferably from 3.2 to 4.2, more preferably from 3.3 to 4.0, additionally preferably from 3.4 to 3.9 and further preferably from 3.5 to 3.7.

An inventive embodiment 5 of the device 1 is one according to any of embodiments 1 to 4, wherein the soft-candy precursor composition in the nozzle is characterized by a temperature in a range from 45 to 95° C., preferably from 50 to 90° C., more preferably from 55 to 80° C., more preferably from 55 to 75° C., more preferably from 55 to 70° C., most preferably from 60 to 66° C.

An inventive embodiment 6 of the device 1 is one according to any of embodiments 1 to 5, wherein the outlet opening has an opening area in a range from 0.1 to 3 $mm^2$, preferably from 0.3 to 3 $mm^2$, more preferably from 0.4 to 1.7 $mm^2$, more preferably from 0.5 to 1.2 $mm^2$.

An inventive embodiment 7 of the device 1 is one according to any of embodiments 1 to 6, wherein the device further comprises
  i) a mixing chamber having a fluid-conducting connection to the outlet opening on the nozzle side before the outlet opening;
  ii) a first container having a fluid-conducting connection to the mixing chamber, the first container comprising a base composition; and
  iii) a further container having a fluid-conducting connection to the mixing chamber, the further container comprising an acid.

An inventive embodiment 8 of the device 1 is one according to any of embodiments 1 to 7, wherein the device further comprises a drive unit, the drive unit being designed to drive a movement of the nozzle relative to the substrate.

An inventive embodiment 9 of the device 1 is one according to any of embodiments 1 to 8, wherein the device further comprises a control unit, the control unit being designed to control a movement of the nozzle, or a discharge of the soft-candy precursor composition from the outlet opening, or both.

An inventive embodiment 10 of the device 1 is one according to embodiment 9, wherein the control unit comprises a control software.

An inventive embodiment 11 of the device 1 is one according to any of embodiments 1 to 10, wherein the device further comprises an electronic data storage device, the electronic data storage device comprising a model of the soft candy.

An inventive embodiment 12 of the device 1 is one according to embodiment 11, wherein the model is a CAD model.

A contribution to at least partially achieving one of the objects of the invention is made by an embodiment 1 of a process 2 for producing a soft candy using the device 1 according to any of embodiments 1 to 12.

A contribution to at least partially achieving one of the objects of the invention is made by an embodiment 1 of use 1 of a soft-candy precursor composition characterized by a water content in a range from 15 to 24% by weight, preferably from 16 to 23% by weight, more preferably from 17 to 22% by weight, based in each case on the soft-candy precursor composition, for a production of a soft candy by means of shaping of the soft-candy precursor composition by means of a nozzle.

A contribution to at least partially achieving one of the objects of the invention is made by an embodiment 1 of use 2 of the device 1 according to any of embodiments 1 to 12 for a production of a soft candy.

Preferred components and constituents of an inventive embodiment of a category of the invention are also preferred in further embodiments of the other categories of the invention for identically named or equivalent components and constituents.

Soft Candy

A soft candy preferably has a highly viscous, tough consistency. Soft candies are preferably chewed when eaten. During chewing, the soft candy preferably dissolves little by little. A preferred soft candy has a water content in a range from 1 to 20% by weight, preferably in a range from 5 to 20% by weight, more preferably in a range from 10 to 20% by weight, most preferably in a range from 15 to 20% by weight, based on the total weight of the soft candy. A preferred soft candy is elastically deformable. A particularly preferred soft candy has a Shore A hardness of 70 or less, preferably of 65 or less, more preferably of 60 or less, more preferably of 55 or less, more preferably of 50 or less, more preferably of 45 or less, more preferably of 40 or less, more preferably of 35 or less, more preferably of 30 or less, more preferably of 25 or less, more preferably of 20 or less, more preferably still of 20 or less, more preferably still of 15 or less, most preferably of 10 or less. A further preferred soft candy is one selected from the group consisting of a fruit gum, a wine gum, a toffee and a chewy candy or a combination of at least two thereof. A further preferred soft candy comprises a hydrocolloid. A preferred hydrocolloid is gelatin. A particularly preferred soft candy does not comprise any ingredient of animal origin, i.e., is vegan. Furthermore, it is preferred that the soft candy according to the invention comprises theobromine or a theobromine derivative to an extent of less than 0.5 g/kg of soft candy, preferably less than 0.2 g/kg of soft candy and further preferably less than 0.1 g/kg of soft candy. Furthermore, it is preferred that the soft candy according to the invention does not comprise theobromine or a theobromine derivative. Moreover, it is preferred that the soft candy according to the invention comprises cocoa butter to an extent of less than 15% by weight of the soft candy, preferably less than 5% by weight of the soft candy and further preferably less than 0.1% by weight of the soft candy. Furthermore, it is preferred that the soft candy according to the invention does not comprise cocoa butter. Soft candies of a preferred embodiment of the invention correspond to the gums in the context of item D 3.2 on page 9 of the *Richtlinie für Zuckerwaren* [Guidelines for confectionery products] of the *Bund für Lebensmittelrecht und Lebensmittelkunde e. V.* [German Federation for Food Law and Food Science], 2012 edition.

Soft-Candy Precursor Composition

A soft-candy precursor composition is a composition from which a soft candy can be produced by further processing. A preferred soft-candy precursor composition comprises, as essential constituent, a sugar or a sugar substitute or both. A preferred sugar is one selected from the group consisting of a polysaccharide, sucrose, glucose, fructose and inverted sugar or a combination of at least two thereof. A preferred sugar substitute is one selected from the group consisting of isomalt, mannitol, sorbitol, xylitol and polydextrose or a combination of at least two thereof. A further preferred soft-candy precursor composition further comprises one selected from the group consisting of a milk preparation, a vegetable fat, an emulsifier, a color mixture, an oil, an active ingredient, a plant extract and a flavoring or a combination of at least two thereof. A preferred oil is an essential oil. A preferred essential oil is one selected from the group consisting of a eucalyptus oil, a mint oil and a menthol or a combination of at least two thereof. A preferred active ingredient exhibits one selected from the group consisting of a mucolytic action, a painkilling action, a swelling-alleviating action and an anti-inflammatory action or a combination of at least two thereof. A preferred plant extract is one selected from the group consisting of a herbal extract, a root extract and a bark extract or a combination of at least two thereof. A preferred herbal extract is an extract from one selected from the group consisting of sage, ribwort plantain, primrose and *Althaea* or a combination of at least two thereof. A preferred root extract is a *Glycyrrhiza glabra* root extract, often also referred to as liquorice. A preferred flavoring is an artificial flavoring or a natural flavoring or both. A further preferred flavoring is a fruit flavoring. A particularly preferred soft-candy precursor composition does not comprise any ingredient of animal origin, i.e., is vegan.

Preferably, the soft-candy precursor composition is present as a liquid gel having a complex viscosity in a range from 500 to 5000 Pa·s, particularly preferably in a range from 1600 to 4000 Pa·s and more preferably in a range from 1000 to 3000 Pa·s. Furthermore, it is preferred in this connection that the soft-candy precursor composition has a loss modulus in a range from 1000 to 13 000 Pa, particularly preferably in a range from 3000 to 10 000 Pa and more preferably in a range from 4000 to 6000 Pa. It is also preferred in this connection that the soft-candy precursor composition has a storage modulus in a range from 5000 to 50 000 Pa, particularly preferably in a range from 15 000 to 35 000 Pa and more preferably in a range from 20 000 to 25 000 Pa.

Diameter

A diameter of a soft candy is a line which runs exactly from a first point of an external surface of the soft candy to a second point of the external surface of the soft candy and, while doing so, intersects the geometric center of a plane of the soft candy in which the line lies. Here, the geometric center is based on an external shape of the soft candy.

Hole

A hole can be an indentation or a tunnel. An indentation comprises an entrance area, wherein the entrance area is immaterial, and an end area, wherein the end area is a surface of the soft candy. A tunnel comprises an entrance area, wherein the entrance area is immaterial, and an end area, wherein the end area can be immaterial or a surface of the soft candy. Thus, a tunnel can run through the soft candy, i.e., comprise an entrance and an exit. Furthermore, a tunnel can comprise an entrance and end in the soft candy. A preferred hole is at least partly filled with one selected from the group consisting of a liquid, a cream, a gel and a powder or with a combination of at least two thereof. Here, a preferred liquid is a juice, preferably a fruit juice. A preferred powder is a sherbet powder.

Drive Unit

A preferred drive unit is an actuator or a motor or both. A preferred motor is a stepper motor.

CAD

CAD stands for computer-aided design. In this connection, computer-aided means by means of EDP (electronic data processing).

Interior

In the context of this document, an interior is a volume, the imaginary surface of which is contacted by the wall of the soft candy to an extent of at least 50% of the surface.

Base Area

A base area of a soft candy is preferably designed for depositing or placing the soft candy on a flat support by contacting the base area with the flat support. Preferably, the base area is flat. A further preferred base area can deviate from a flat configuration owing to drying of the soft candy. In any case, the soft candy is deposited or placed in a stable position by depositing or placing the base area of the soft candy on a flat support. A further preferred base area does not comprise a punch. A further preferred base area is situated opposite a punched side of the soft candy.

Acid

The term acid covers both the free acids and the salts of the acids and anhydrides of the acids. A preferred acid is an organic acid. Preferably, the acid is a carboxylic acid, preferably a carboxylic acid with two or more than two carboxyl groups, particularly preferably a tricarboxylic acid. It is preferred that the acids according to the invention contain 2 to 20, preferably 2 to 7 and particularly preferably 3 to 4, carbon atoms per molecule. Preferably, an anhydrous acid is used according to the invention. Hereunder, preference is given to an acid selected from the group consisting of oxalic acid, malonic acid, succinic acid, glutaric acid, adipic acid, pimelic acid, suberic acid, azelaic acid, sebacic acid, brassylic acid, thapsic acid, citric acid, malic acid and lactic acid, or a combination of at least two thereof. In another configuration of the invention, hydroxycarboxylic acids are preferred as acids, particular preference being given to hydroxycarboxylic acids bearing two or more than two carboxyl groups. Hydroxycarboxylic acids preferred according to the invention are selected from the group consisting of citric acid, malic acid and lactic acid, or a combination of at least two thereof. Citric acid, especially anhydrous citric acid, is particularly preferred according to the invention.

Base Composition

A preferred base composition comprises the same polysaccharide or the same polypeptide or both as the soft-candy precursor composition.

Foundation Composition

A preferred foundation composition comprises the same polysaccharide or the same polypeptide or both as the soft-candy precursor composition. In contrast to the acid composition, the foundation composition comprises more gelling agents, preferably polysaccharides such as pectin, or polypeptides such as gelatin or both, wherein a fraction, based in each case on the dry weight of the foundation composition, is in a range from 0.1 to 15% by weight, preferably in a range from 1 to 10% by weight and particularly preferably in a range from 1.5 to 5% by weight. The following statements relating to "Polysaccharides" also apply to the monosaccharides used in the foundation composition. Preferably, the foundation composition comprises monosaccharides, based in each case on the dry weight of the foundation composition, in a range from 40 to 80% by weight, preferably in a range from 50 to 70% by weight and particularly preferably in a range from 55 to 65% by weight.

Furthermore, the foundation composition preferably has a water content, based in each case on the total weight of the foundation composition, in a range from 7 to 45% by weight, preferably in a range from 10 to 35% by weight and particularly preferably in a range from 15 to 25% by weight. In one embodiment, the foundation composition has a complex viscosity in a range from 700 to 1300 Pa·s, particularly preferably in a range from 1000 to 1250 Pa·s and more preferably in a range from 1100 to 1200 Pa·s. In one embodiment, the foundation composition has a loss modulus in a range from 3000 to 7000 Pa, particularly preferably in a range from 4000 to 5500 Pa and more preferably in a range from 4700 to 5200 Pa. In one embodiment, the foundation composition has a storage modulus in a range from 5000 to 15 000 Pa, particularly preferably in a range from 9000 to 13 000 Pa and more preferably in a range from 10 000 to 12 000 Pa.

Acid Composition

A preferred acid composition comprises more of the same acid as the soft-candy precursor composition. In contrast to the foundation composition, the acid composition comprises more acid, preferably organic acid such as citric acid, wherein a fraction, based in each case on the dry weight of the acid composition, is in a range from 0.1 to 15% by weight, preferably in a range from 0.5 to 10% by weight and particularly preferably in a range from 1 to 4% by weight. The above statements relating to "Acid" also apply to the acids used in the acid composition. Preferably, the acid composition comprises monosaccharides, based in each case on the dry weight of the foundation composition, in a range from 40 to 80% by weight, preferably in a range from 50 to 70% by weight and particularly preferably in a range from 55 to 65% by weight. Furthermore, the acid composition preferably has a water content, based in each case on the total weight of the acid composition, in a range from 7 to 45% by weight, preferably in a range from 10 to 35% by weight and particularly preferably in a range from 15 to 25% by weight. In one embodiment of the invention, the acid composition preferably has a water content, based in each case on the total weight of the acid composition, in a range from 3 to 45% by weight, preferably in a range from 5 to 30% by weight and particularly preferably in a range from 8 to 20% by weight. In one embodiment, the foundation composition has a complex viscosity in a range from 5 to 50 000 Pa·s, particularly preferably in a range from 300 to 20 000 Pa·s and more preferably in a range from 600 to 9000 Pa·s. In one embodiment, the foundation composition has a loss modulus in a range from 50 to 500 000 Pa, particularly preferably in a range from 2500 to 100 000 Pa and more preferably in a range from 5000 to 50 000 Pa. In one embodiment, the foundation composition has a storage modulus in a range from 10 to 75 000 Pa, particularly preferably in a range from 1800 to 50 000 Pa and more preferably in a range from 3500 to 15 000 Pa.

Polysaccharides

According to the invention, the term polysaccharides is understood to mean a molecule formed from at least 3, preferably at least 10 and particularly preferably at least 20, sugar units. Said molecule comprises galacturonic acid, preferably α-D-galacturonic acid, preferably to an extent of 50% by weight and more, preferably to an extent of 55% by weight and more, and particularly preferably to an extent of 65% by weight and more. As a further monosaccharide, the molecule can comprise rhamnose. Furthermore, it is preferred that the hydroxyl groups on the $C_2$ or $C_3$ atom of the galacturonic acid units are at least partially acetylated or substituted by further neutral sugars, more particularly D-galactose, D-xylose, L-arabinose or L-rhamnose. Furthermore, it is preferred that the molecules are branched. The branching is preferably achieved via the galacturonic acid of the main chain.

Also, it is preferred that the molecules are at least partially esterified, preference being given to an esterification with an alcohol which is preferably a $C_1$ to $C_{10}$, preferably $C_1$ to $C_5$, and particularly preferably a $C_1$ to $C_3$ hydrocarbon. Particular preference is given to the esterification with methanol. It is further preferred that the fraction of the esterified carboxyl groups of the sugars, referred to as degree of esterification, is in a range from 50 to 80%, preferably in a range from 52 to 70%, more preferably in a range from 55 to 65%, particularly preferably in a range from 59 to 61%.

According to the invention, pectins are particularly preferred as polysaccharides. These include in particular citrus pectins and apple pectins. These are, for example, commercially available from Herbstreith & Fox KG Pektin-Fabriken.

The polysaccharide according to the invention preferably exhibits a USA-SAG (SAG—Strain-induced Alignment in a Gel) of at least 150° USA-SAG, preferably at least 160° USA-SAG, and particularly preferably at least 170° USA-SAG. The higher the USA-SAG value, the higher the degree of esterification.

Polypeptide

According to the invention, the term polypeptide is understood to mean a molecule formed from at least 10, preferably at least 50 and particularly preferably at least 70, amino acids. Preferably, the polypeptides according to the invention have a molecular weight of at least 10 000 g/mol, preferably at least 25 000 g/mol and particularly preferably at least 100 000 g/mol. In many cases, molecular weights above 300 000 g/mol are considered to be the upper limit. Furthermore, the polypeptide according to the invention comprises tryptophan to an extent of less than 5% by weight, preferably less than 3% by weight and particularly preferably less than 0.5% by weight, based in each case on the total weight of the polypeptide. Preferred polypeptides according to the invention are free of tryptophan. Polypeptides preferred according to the invention are gelatin. Preferred polypeptides have an isoelectric point (IEP) in the pH range from 4.7 to 5.3, preferably from 4.8 to 5.2, more preferably from 4.9 to 5.1. Further preferred polypeptides have an isoelectric point in the range from 7.7 to 9.3, preferably from 7.8 to 9.2, more preferably from 7.9 to 9.1, most preferably from 8 to 9. Preferred polypeptides have a Bloom number in the range from 140 to 300, preferably in a range from 200 to 280 and particularly preferably in a range from 220 to 270.

Methods of Measurement

The following methods of measurement were used in the context of the invention. Unless otherwise specified, the measurements were carried out at an ambient temperature of 25° C., an ambient air pressure of 100 kPa (0.986 atm) and a relative air humidity of 50%.

Shore Hardness

Shore hardness was measured by using the method according to VDI/VDE 2616 part 2 (2004-04): "*Härteprüfung an Kunststoffen and Gummi*" [Hardness testing of plastics and rubber].

Bloom Number

Gel-strength measurement for gelatin is done via a Bloom gelometer. The measurement is carried out as described in United States Pharmacopeia XX, page 1017 (1990).

Isoelectric Point

Like all other proteins, gelatin also has amphoteric properties. Therefore, there is a pH at which the (positive) electric charge of the amino groups corresponds to the (negative) charge of the carboxyl groups. This isoelectric point of gelatin is dependent on the method of preparation (acid treatment 4.7 to 5.2, alkaline treatment 8 to 9). At the isoelectric point, gelatin solubility is lowest, and this can be used as a method of determination (strongest turbidity of the gel).

Water Content

The following instruments are used to measure the water content: a Sartorius MA 30 moisture analyzer (Sartorius AG, Göttingen, Germany), single-use aluminum dish, spoon. The moisture analyzer is not prewarmed prior to the measurement. If a measurement has already been carried out using the moisture analyzer, the moisture analyzer is left to cool with the hood open for at least 15 minutes before a further measurement. The moisture analyzer is switched on. The measurement parameters are 105° C. (drying temperature), auto, 0-100%. The hood is opened and an aluminum dish is set down. Taring is performed using the Enter key. A sample having a mass in a range from 5.0 to 5.5 g is provided. The aluminum dish is placed on a bench and the sample is evenly distributed on the dish using the spoon. The dish is placed on the holder and the hood is closed. The moisture analyzer starts the measurement operation automatically. When the moisture analyzer displays "END", the measurement result is read.

pH 5 g of a sample are admixed with 95 g of distilled water and dissolved. The solution thus obtained is used for pH determination using a WTW portable pH meter pH 3210. The measurement is done at room temperature.

USA-SAG

The USA-SAG value describes the gel strength of pectin. To determine USA-SAG, a sugar/water gel with 65% dry substance and a pH of 2.2 as standard gel is boiled and filled while hot into a standardized beaker. After cooling, the gel is overturned in each case from the beaker and the percentage subsidence due to the gel's own weight is measured after a defined time. The standard gel subsides by 23.5% within 2 minutes. The USA-SAG value for any desired gels indicates how many grams of sugar are required in order to obtain with 1.0 g of pectin the same measurement result as for the standard gel. The higher the US-SAG value, the greater the pectin gel strength.

Complex Viscosity, Loss Modulus and Storage Modulus

Complex viscosity, "in-phase" storage modulus and "out-of-phase" loss modulus are determined using a Rheometrics ARES rheometer which is set to 10 rad/s and with a shear amplitude of 1%. The sample is introduced between two parallel 25 mm plates and brought to the desired temperature in a nitrogen atmosphere.

Examples

The invention will be described in more detail below by means of examples and drawings, though the examples and drawings do not mean any restriction of the invention. Unless otherwise specified, the drawings are not true to scale.

Preparation of Base Compositions 1 and 2

In a 5 l batch cooker, 375 g of EU category 2 sugar from Pfeifer & Langen GmbH & Co. KG in dry state are homogeneously mixed with 16 g of pectin having a USA-SAG of 170° USA-SAG from Cargill GmbH as polysaccharide in order to avoid clump formation. 57 g of maltodextrin from Roquette SA as oligosaccharide and also sodium-potassium-tartrate and potassium citrate as buffer salt mixture in an amount of 13 g are added to this. 200 g of water are added with stirring to the dry mixture thus obtained in order to obtain a honey-like, milky phase. 295 g of glucose syrup from Roquette SA having a water content of 20.5% by weight are added, likewise with stirring, to the phase. The mixture thus obtained is first boiled to 105° C. to a water content of 25% by weight.

To obtain base composition 1, a portion of the boiled composition is poured onto molding starch from Cargill GmbH in order to reduce the water content to a value specified in Table 1 for base composition 1.

To obtain base composition 2, a portion of the boiled composition as described above is boiled through to 110° C. to a water content specified in Table 1.

TABLE 1

Water content of base compositions 1 and 2

|  | A | B | C | D |
|---|---|---|---|---|
| Base composition 1 | | | | |
| Water content [% by weight] | 7 | 17 | 22 | 27 |
| Base composition 2 | | | | |
| Water content [% by weight] | 7 | 17 | 22 | 27 |

Preparation of Base Compositions 3 and 4

Base compositions 1A to 1D and 2A to 2D having the values specified in Table 1 are first prepared. To the base compositions thus obtained, a solution composed of 31 g of gelatin having a Bloom number of 240 Bloom, which was previously dissolved in 31 g of hot water, is added, mixed, and evacuated to withdraw the dissolution water. The composition thus obtained is referred to as base composition 3. A composition dehydrated via molding starch as described above instead of by evacuation is referred to as base composition 4. The water contents of base compositions 3 and 4 are shown in Table 2.

TABLE 2

Water content of base compositions 3 and 4

|  | A | B | C | D |
|---|---|---|---|---|
| Base composition 3 | | | | |
| Water content [% by weight] | 7 | 17 | 22 | 27 |
| Base composition 4 | | | | |
| Water content [% by weight] | 7 | 17 | 22 | 27 |

Preparation of Precursor Compositions 1 to 4

Portions of 100 g, in each case, of base compositions 1 to 4 are heated in a microwave to below 100° C. in order to liquefy them. Anhydrous citric acid is admixed with water in the weight ratio of anhydrous citric acid to water of 1:0.7. The aqueous citric acid solution thus obtained is added to the portions of the liquid base compositions and mixed. The respective amounts are shown in Table 3.

TABLE 3

Water content, added amount of citric acid solution, and pH of prepared precursor compositions

| Base composition | Water content of base composition [% by weight] | Amount of citric acid solution [g]/pH/precursor composition # | | | | |
|---|---|---|---|---|---|---|
| 1A | 7 | | | 2.5/3.6/1A3 | | |
| 1B | 18 | 0.5/4.3/1B1 | 1.0/3.9/1B2 | 2.5/3.6/1B3 | 2.8/3.5/1B4 | 5/2.8/1B5 |
| 1C | 22 | 0.5/4.3/1C1 | 1.0/4/1C2 | 2.5/3.6/1C3 | 2.8/3.5/1C4 | 5/2.8/1C5 |
| 1D | 27 | | | 2.5/3.6/1D3 | | |
| 2A | 7 | | | 2.5/3.6/2A3 | | |
| 2B | 18 | | | 2.5/3.6/2B3 | | |
| 2C | 22 | | | 2.5/3.6/2C3 | | |
| 2D | 27 | | | 2.5/3.6/2D3 | | |
| 3A | 7 | | | 2.5/3.6/3A3 | | |
| 3B | 18 | 0.5/4.2/3B1 | 1.0/3.9/3B2 | 2.5/3.6/3B3 | 2.8/3.5/3B4 | 5/2.8/3B5 |
| 3C | 22 | 0.5/4.3/3C1 | 1.0/4/3C2 | 2.5/3.6/3C3 | 2.8/3.5/3C4 | 5/2.8/3C5 |
| 3D | 27 | | | 2.5/3.6/3D3 | | |
| 4A | 7 | | | 2.5/3.6/4A3 | | |
| 4B | 18 | | | 2.5/3.6/4B3 | | |
| 4C | 22 | | | 2.5/3.6/4C3 | | |
| 4D | 27 | | | 2.5/3.6/4D3 | | |

Printing

Immediately after addition of the citric acid, 5 ml of the particular liquid precursor composition are filled into a commercially available 5 ml disposable plastics syringe having a circular dispensing opening having an inner diameter of 1 mm. Directly after the filling of the syringe, the precursor composition was continuously dispensed within 25 s across a 5.5 cm stretch in strands lying on top of one another in order to obtain a wall as product. The observations and experimental results are put together in Table 4 for each of the precursor compositions investigated.

TABLE 4

Observations and experimental results

| Observations and experimental results | Melting of the strands-unstable product (comparison) | Stable product (inventive) | Not extrudable-solidification (comparison) |
|---|---|---|---|
| Precursor compositions | 1D3; 1B1; 1C1; 3D3; 3B1; 3C1 | Stable: 1B2; 1C2; 1B4; 1C4; 3B2; 3C2; 3B4; 3C4 | 1A3; 1B5; 1C5; 3A3; 3B5; 3C5 |
| Precursor compositions | | Highly stable: 1B3; 1C3; 2B3; 2C3; 3B3; 3C3; 4B3; 4C3 | |

Evaluation

Table 4 reveals that precursor compositions 1B2; 1C2; 1B4; 1C4; 3B2; 3C2; 3B4 and 3C4 lead to a stable wall, which, however, must be subsequently dried in order to obtain the softness and stability typical of fruit gums or soft candies. Precursor compositions 1B3; 1C3; 2B3; 2C3; 3B3; 3C3; 4B3 and 4C3 reach the softness and stability typical of fruit gums immediately after the printing of the wall. The walls printed using the precursor compositions mentioned in this paragraph had a length of 5.5 cm, a height of 1 cm and a wall thickness of 1.4 mm. The Shore A hardnesses measured on the products are below 10.

By contrast, precursor compositions 1D3; 1B1; 1C1; 3D3; 3B1 and 3C1 do not lead to stable walls. On the contrary, the strands melt into a flat puddle, and so the three-dimensional structure of the wall is not obtained. Precursor compositions 1A3; 1B5; 1C5; 3A3; 3B5 and 3C5 already solidify in the syringe, and so printing is not possible.

Foundation Composition (GM-1)

In a 5 l batch cooker, 375 g of sugar in the form of EU category 2 monosaccharide from Pfeifer & Langen GmbH & Co. KG in a dry state are homogeneously mixed with 32 g of pectin as polysaccharide having a USA-SAG of 170° from Cargill GmbH in order to avoid clump formation. 57 g of maltodextrin from Roquette SA as oligosaccharide and also sodium-potassium-tartrate and potassium-citrate as buffer salt mixture in an amount of 26 g are added to this. 400 g of water are added with stirring to the dry mixture thus obtained in order to obtain a honey-like, milky phase. 295 g of glucose syrup from Roquette SA having a water content of 20.5% by weight are added, likewise with stirring, to the phase as further monosaccharide. The mixture thus obtained is first boiled to 105° C. to a water content of 24% by weight in order to obtain the foundation composition.

Acid Composition (SM-1)

In a 5 l batch cooker, 375 g of sugar in the form of EU category 2 monosaccharide from Pfeifer & Langen GmbH & Co. KG in a dry state are initially charged. 57 g of maltodextrin from Roquette SA as oligosaccharide are added to this and homogeneously mixed. 125 g of water are added with stirring to the dry mixture thus obtained in order to obtain a liquid, milky phase. 295 g of glucose syrup from Roquette SA having a water content of 20.5% by weight are added, likewise with stirring, to the phase as further monosaccharide. The mixture thus obtained is first boiled to 110° C. to a water content of 10% by weight. This is followed by cooling the composition thus obtained to 70° C. 40 g of a citric acid solution (1:0.7-anhydrous citric acid:water) are added to the cooled composition and homogeneously mixed with the composition in order to obtain the acid composition. After the addition of the citric acid solution, the acid composition has a water content of 12% by weight.

Printing of GM-1 and SM-1

50 g of GM-1 and 50 g of SM-1 are added to a PE beaker and homogeneously mixed with a spoon at the temperature specified in Table 5 for 15 sec to give a printing composition having a water content of 18% by weight. Immediately after the end of mixing, the pH was determined with a value of 3.6. Immediately thereafter and after the periods specified in Table 5, 5 ml of the printing composition are filled into a commercially available 5 ml disposable plastics syringe having a circular dispensing opening having an inner diameter of 1 mm. Directly after the filling of the syringe, the printing composition was continuously dispensed within 25 s across a 5.5 cm stretch in strands lying on top of one another in order to obtain a wall as product. The observations and experimental results are put together in Table 5 for each precursor composition investigated.

Roquette SA having a water content of 20.5% by weight are added, likewise with stirring, to the phase as further monosaccharide. The mixture thus obtained is first boiled to 105° C. to a water content of X % by weight in order to obtain the foundation composition.

Acid Composition (SM-2)

In a 5 l batch cooker, 375 g of sugar in the form of EU category 2 monosaccharide in a dry state from Pfeifer & Langen GmbH & Co. KG are initially charged. 57 g of maltodextrin from Roquette SA as oligosaccharide are added to this and homogeneously mixed. 125 g of water are added with stirring to the dry mixture thus obtained in order to obtain a liquid, milky phase. 295 g of glucose syrup from Roquette SA having a water content of 20.5% by weight are added, likewise with stirring, to the phase as further monosaccharide. The mixture thus obtained is first boiled to 110° C. to a water content of X % by weight. This is followed by cooling the composition thus obtained to 70° C. Y g of a citric acid solution (1:0.7-anhydrous citric acid:water) are

TABLE 5

Time- and temperature-dependence of printing of precursor composition composed of foundation composition and acid composition

| Expt. No. | Mixing and printing temperature of the precursor composition [° C.] | Period between making and printing the precursor composition [sec.] | Printing result |
| --- | --- | --- | --- |
| 1. | 10 | 3 | Printing product melts |
| 2. | 20 | 3 | Printing product melts |
| 3. | 20 | 150 | Not printable - precursor composition too solid |
| 4. | 40 | 3 | Printable at low pressure - stable printing product |
| 5. | 40 | 15 | At higher pressure than in experiment No. 4 - stable printing product |
| 6. | 40 | 70 | At higher pressure than in experiment No. 5 - stable printing product |
| 7. | 40 | 130 | At higher pressure than in experiment No. 6 - stable printing product |
| 8. | 40 | 300 | Not printable - precursor composition too solid |
| 9. | 60 | 3 | At higher pressure than in experiment No. 7 - stable printing product |
| 10. | 60 | 15 | Not printable - precursor composition too solid |
| 11. | 60 | 70 | Not printable - precursor composition too solid |

Foundation Composition (GM-2) In a 5 l batch cooker, 375 g of sugar in the form of EU category 2 monosaccharide in a dry state from Pfeifer & Langen GmbH & Co. KG are homogeneously mixed with 32 g of pectin as polysaccharide having a USA-SAG of 170° from Cargill GmbH in order to avoid clump formation. 57 g of maltodextrin from Roquette SA as oligosaccharide and also sodium-potassium-tartrate and potassium-citrate as buffer salt mixture in an amount of 26 g are added to this. 400 g of water are added with stirring to the dry mixture thus obtained in order to obtain a honey-like, milky phase. 295 g of glucose syrup from added to the cooled composition and homogeneously mixed with the composition in order to obtain the acid composition.

Printing of GM-2 and SM-2

50 g of GM-2 and 50 g of SM-2 are used as previously described for the printing of GM-1 and SM-1, and printed at a temperature of 40° C. within 3 seconds after the mixing. The pH measurement was done immediately after the 15-second mixing. The water amounts X and acid amounts Y are selected such that the values specified in Table 6 are achieved.

TABLE 6

Dependence on water content and pH

| Expt. No. | pH | A Water in % by weight | B Water in % by weight | C Water in % by weight | D Water in % by weight | E Water in % by weight |
|---|---|---|---|---|---|---|
| 12. | 5 | 10 (----) | 18 (-) | 22 (-) | 25 (--) | 27 (--) |
| 13. | 3.6 | 10 (----) | 18 (+) | 22 (+) | 25 (---) | 27 (---) |
| 14. | 2.8 | 10 (----) | 18 (-) | 22 (-) | 25 (---) | 27 (---) |

(-) Forms gel and can be printed, the printing product is not dimensionally stable and slowly melts.
(--) Forms gel and can be printed, the printing product does not assume a 3D shape because it melts at once.
(---) Forms gel, it leads to recurring blockages in the syringe opening of the 5 ml disposable plastics syringe, and so there is formation of an inhomogeneous printing product which melts at once.
(----) Cannot be printed - too hard or viscous.
(+) Printable at low pressure - stable 3D printing product (cf. Table 5, No. 4.) which is a gum in the context of item D 3.2 on page 9 of the *Richtlinie für Zuckerwaren* of the *Bund für Lebensmittelrecht und Lebensmittelkunde e. V.*, 2012 edition.
The printing products with the ratings (-) to (----) are not gums in the context of item D 3.2 on page 9 of the *Richtlinie für Zuckerwaren* of the *Bund für Lebensmittelrecht und Lebensmittelkunde e. V.*, 2012 edition.

Figure 2:
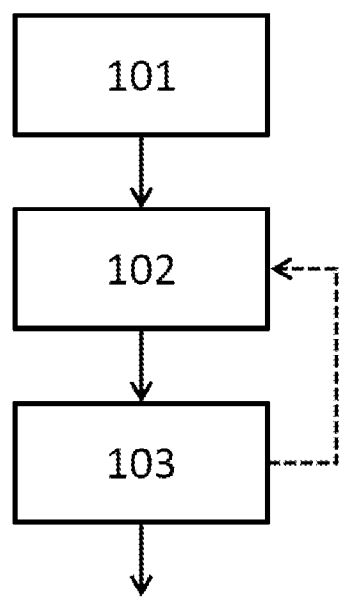
Figure 3:
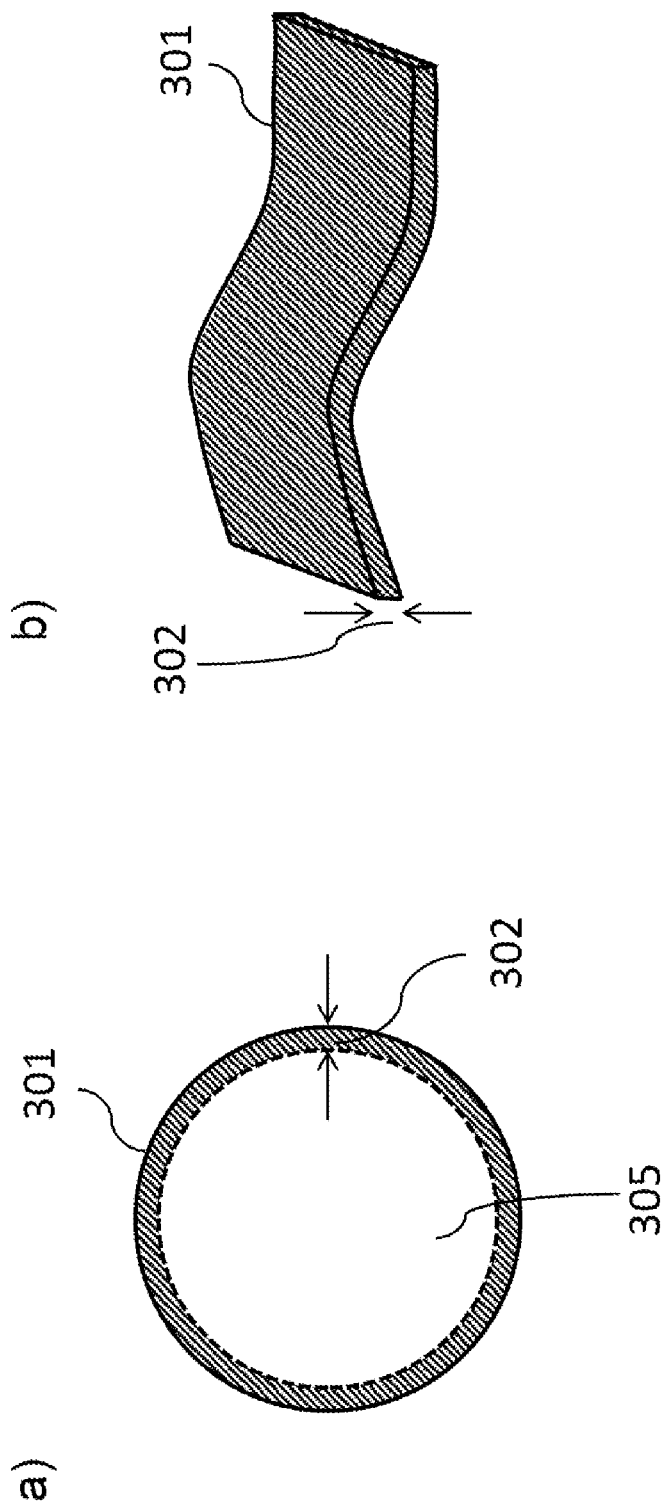
Figure 4:
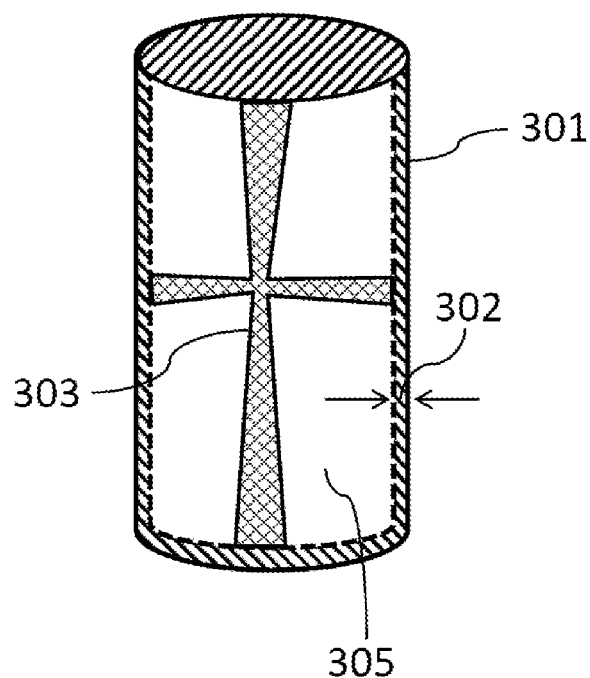
Figure 5:
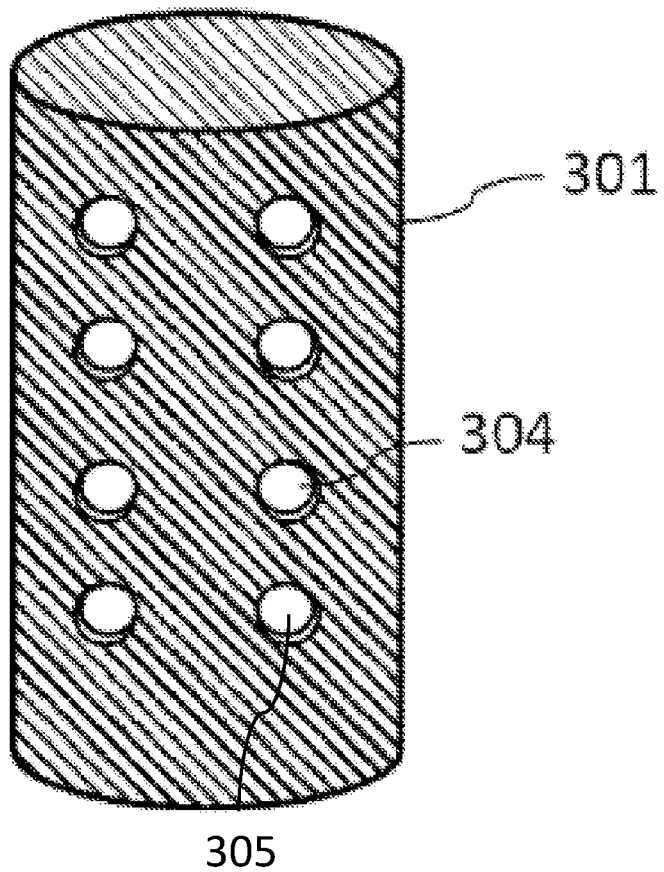
Figure 8:
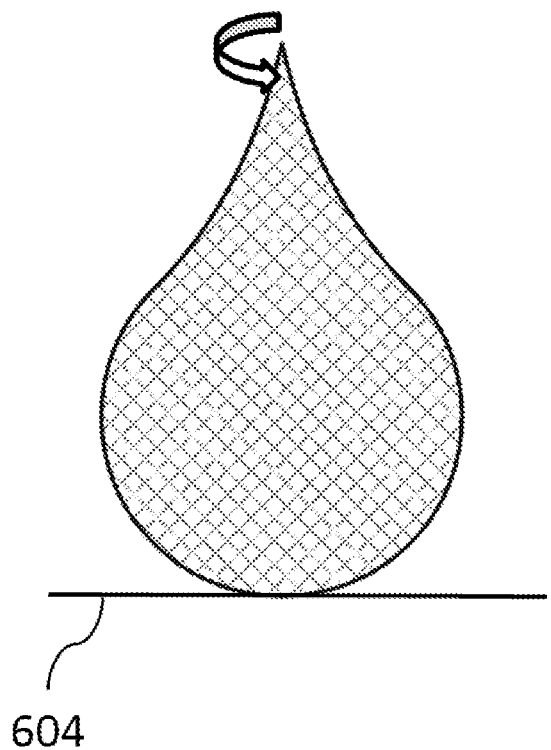
Figure 9:
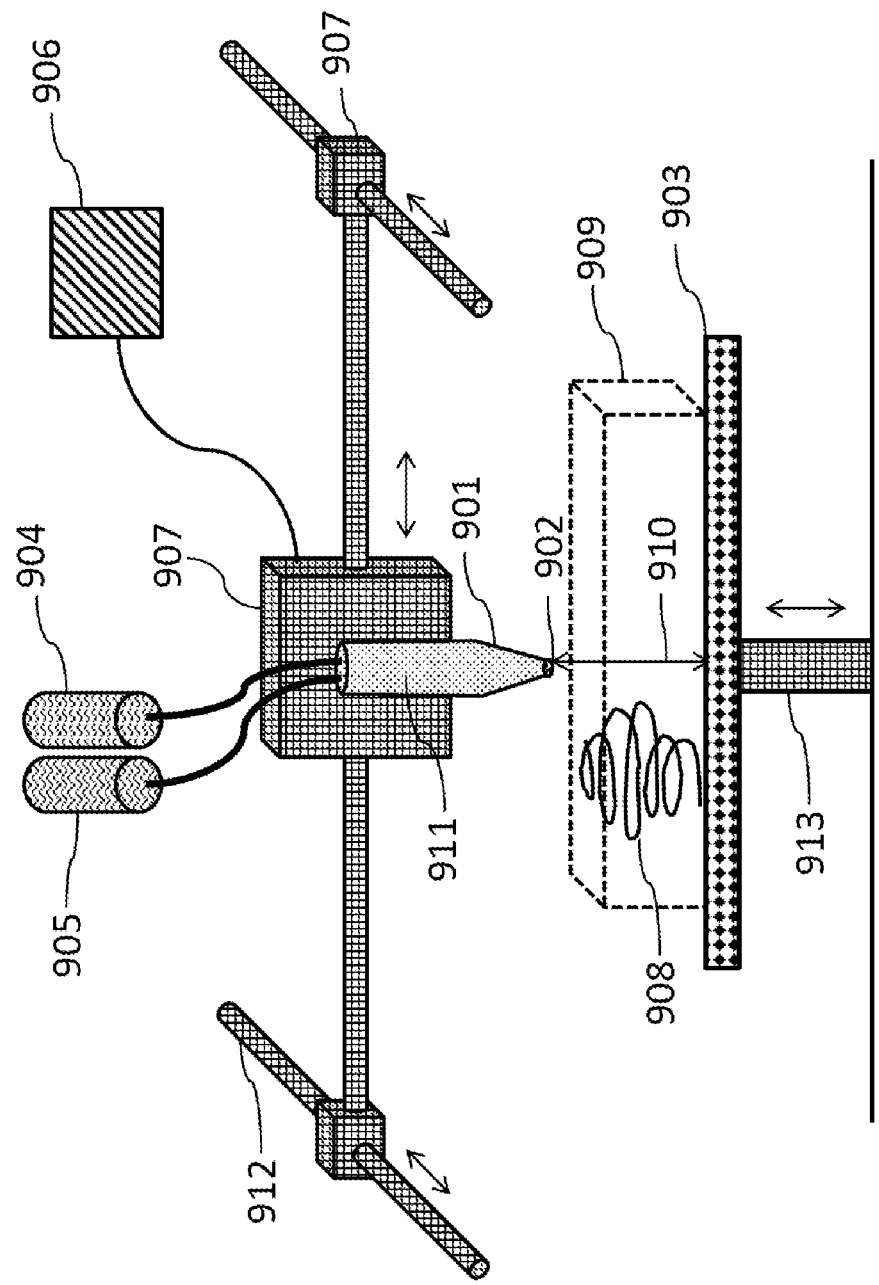

What are shown are:

FIG. 1 a flowchart of a process according to the invention;

FIG. 2 a flowchart of a further process according to the invention;

FIG. 3a) a schematic cross section of a soft candy according to the invention;

FIG. 3b) a schematic depiction of a further soft candy according to the invention;

FIG. 4 a schematic cross section of a further soft candy according to the invention;

FIG. 5 a schematic depiction of a further soft candy according to the invention;

FIG. 6a) a schematic depiction of a further soft candy according to the invention;

FIG. 6b) a schematic depiction of a further soft candy according to the invention;

FIG. 7a) a schematic cross section of a further soft candy according to the invention;

FIG. 7b) a schematic depiction of a further soft candy according to the invention;

FIG. 8 a schematic depiction of a further soft candy according to the invention; and FIG. 9 a schematic depiction of a device according to the invention for producing a soft candy.

FIG. 1 shows a flowchart of a process 100 according to the invention for producing a soft candy 300. In a process step a) 101, a soft-candy precursor composition according to precursor composition 2B3 as specified in the above examples is provided. This involves the admixing of base composition 2B with the citric acid solution immediately before starting a process step b) 102. In the process step b), the soft-candy precursor composition (precursor composition 2B3) is added to a syringe nozzle 901, and the soft-candy precursor composition is shaped to give a shaped article by dispensing of the soft-candy precursor composition from an outlet opening 902 of the nozzle 901. This is achieved by layer-by-layer spraying of the soft-candy precursor composition onto a substrate 903. In order to shape the shaped article using the soft-candy precursor composition, the nozzle 901 is guided here such that the outlet opening 902 follows a spiral three-dimensional trajectory 908. Here, the trajectory 908 starts above the substrate 903 and leads upward, and so a distance 910 between the outlet opening 902 and the substrate 903 increases along the three-dimensional trajectory 908. Thus, it is possible with the process 100 according to FIG. 1 to produce the soft candy 300 according to FIG. 7b). After process step b) 102, the shaped article composed of the soft-candy precursor composition is hardened in a further step 103. This is done at a temperature of 30° C. for 30 minutes.

FIG. 2 shows a flowchart of a further process 100 according to the invention for producing a soft candy 300. The process 100 according to FIG. 2 is performed like the process 100 according to FIG. 1, but, according to FIG. 2, the hardening 300 of the shaped article takes place only after completion of the process step b). Instead, in process step b), the soft-candy precursor composition is dispensed from the outlet opening 902 in portions. After each dispensing of a portion of the soft-candy precursor composition, said portion is first hardened. Then, the outlet opening 902 is guided to a next position on the three-dimensional trajectory 908 and then a next portion of the soft-candy precursor composition is dispensed. This sequence of steps is repeated until the shaped article is formed. This is indicated by the loop in the flowchart (dashed arrow). Thus, the fully-shaped shaped article is directly hardened and the soft candy 300 is thus obtained. The soft candy 300 can be further subjected to an aftertreatment, for example wetting with a powder against adhesion of the soft candy 300 to further soft candies 300.

FIG. 3a) shows a schematic cross section of a soft candy 300 according to the invention. The soft candy 300 is a fruit gum consisting of a wall 301. The wall 301 has a wall thickness 302 of 2 mm. The wall completely surrounds an interior 305. The soft candy 300 is designed as a hollow sphere.

FIG. 3b) shows a schematic depiction of a further soft candy 300 according to the invention. Said soft candy 300 is a wine gum consisting of a wall 301. The wall 301 has a wall thickness 302 of 3 mm. The soft candy 300 is designed as a corrugated layer.

FIG. 4 shows a schematic cross section of a further soft candy 300 according to the invention. The soft candy 300 is a fruit gum consisting of a wall 301. The wall 301 has a wall thickness 302 of 1 mm. The wall completely surrounds an interior 305. The soft candy 300 is designed as a hollow cylinder closed at its end faces and having a support structure 303 in the interior 305.

FIG. 5 shows a schematic depiction of a further soft candy 300 according to the invention. The soft candy 300 is a fruit gum consisting of a wall 301. The wall 301 has a wall thickness of 2 mm. The wall completely surrounds an interior 305. The soft candy 300 is designed as a hollow cylinder having 8 openings 304 in the wall 301.

FIG. 6a) shows a schematic depiction of a further soft candy 300 according to the invention. The soft candy 300 is a foam gum characterized by a diameter 602 in a plane parallel to a base area 601. A dependence of a length of the diameter 602 on a position on a line 603 perpendicular to the base area 601 is describable by a diameter function, the diameter function having two global maxima.

FIG. 6*b*) shows a schematic depiction of a further soft candy 300 according to the invention. The soft candy is a vegan fruit gum reproducing in three dimensions a shape of a Christmas tree. The arrow in FIG. 6*b*) indicates a rotational symmetry of the soft candy 300. The soft candy 300 is characterized by a diameter 602 in a plane parallel to a base area 601. A dependence of a length of the diameter 602 on a position on a line 603 perpendicular to the base area 601 is describable by a diameter function, the diameter function having at least 5 local maxima. The base area 601 is designed for depositing or placing the soft candy 300 on a flat support 604 by contacting the base area 601 with the flat support 604. The base area 601 deviates from a flat configuration owing to drying of the soft candy 300. The soft candy 300 can be placed in a stable position by placing the base area 601 of the soft candy 300 on the flat support 604.

FIG. 7*a*) shows a schematic cross section of a further soft candy 300 according to the invention. The soft candy 300 is a fruit gum comprising a hole 701, the hole 701 having a depth 702 of 10 mm. The hole 701 is an indentation. The soft candy 300 is trough-shaped.

FIG. 7*b*) shows a schematic depiction of a further soft candy 300 according to the invention. The soft candy 300 is a fruit gum comprising a hole 701, the hole 701 having a depth 702 of 20 mm. The hole 701 is a tunnel which completely passes through the soft candy. The soft candy 300 is designed as an open hollow cylinder.

FIG. 8 shows a schematic depiction of a further soft candy 300 according to the invention. The soft candy 300 is a wine gum which does not comprise a base area 601. In particular, the soft candy 300 does not comprise a flat area. Furthermore, the soft candy 300 cannot be brought to a stable position by depositing or placing the soft candy 300 on a flat support 604. The arrow in FIG. 8 indicates a rotational symmetry of the soft candy 300.

FIG. 9 shows a schematic depiction of a device 900 according to the invention for producing a soft candy 300. The device 900 comprises a nozzle 901 which comprises an outlet opening 902 and a soft-candy precursor composition. The soft-candy precursor composition is precursor composition 2B3 according to the above-described examples. The soft-candy precursor composition is characterized by a temperature of 60° C. The outlet opening 902 of the nozzle 901 is characterized by an outlet area of 1 mm². Furthermore, the nozzle 901 comprises a mixing chamber 911 for the mixing of a base composition with the citric acid. By mixing the base composition with the citric acid in the mixing chamber 911, it is possible to obtain the soft-candy precursor composition. The mixing chamber 911 of the nozzle 901 has a fluid-conducting connection to a first container 904 and a further container 905 via a hose in each case. The first container 904 comprises base composition 2B. The further container comprises the citric acid solution according to the above examples for mixing with the base composition. The nozzle 901 is arranged above a substrate 903. By means of a track system 912 and also a vertical translation of the substrate 903 via a lifting device 913 (indicated in each case by arrows) and motors 907, the nozzle 901 can be guided such that the outlet opening 902 can be moved to any point of a three-dimensional working volume 909 above the substrate 903. Thus, the device 900 can generate soft candies 300 in a multiplicity of shapes which fit into the working volume in each case. The guidance of the nozzle 901 by means of the track system 912 and a dispensing of the soft-candy precursor composition from the outlet opening are effected here under computer control via a computer 906. The computer 906 thus acts as a control unit. Furthermore, the computer 906 comprises a hard disk on which CAD models of the multiplicity of shapes of the soft candies 300 are stored. The movement of the outlet opening 902 under computer control is done along a three-dimensional trajectory 908 which lies in the working volume 909. During the movement along the three-dimensional trajectory 908, a distance 910 between the substrate 903 and the outlet opening increases monotonically. Thus, the device 900 is suited to carrying out the process 100 according to FIG. 1. After the soft candy 300 has been made, it is taken away by a conveyor which is preferably designed as an assembly belt and which contains the substrate 903, in order to provide space for the production of a further soft candy.

LIST OF REFERENCE SIGNS

100 Process according to the invention
101 Process step a)
102 Process step b)
103 Hardening
300 Soft candy according to the invention
301 Wall
302 Wall thickness
303 Support structure
304 Opening
305 Interior
601 Base area
602 Diameter
603 Line perpendicular to the base area
604 Flat support
701 Hole
702 Depth
900 Device according to the invention
901 Nozzle
902 Outlet opening
903 Substrate
904 First container
905 Further container
906 Computer
907 Motor
908 Three-dimensional trajectory
909 Three-dimensional working volume
910 Distance between the outlet opening and the substrate
911 Mixing chamber
912 Track system
913 Lifting device

The invention claimed is:

1. A process for producing a candy, the process comprising as process steps
   a) providing a candy precursor composition characterized by a water content in a range from 15 to 24% by weight, based on the candy precursor composition; and
   b) shaping the candy precursor composition by a nozzle having an outlet opening by overlaying a substrate with the candy precursor composition to obtain a shaped article, the outlet opening of the nozzle traveling a three-dimensional trajectory;
   wherein providing the candy precursor composition in process step a) comprises the substeps:
   A) providing a foundation composition;
   B) providing an acid composition with a water content in a range from 3 to 45% by weight, based on the total weight of the acid composition; and C) contacting the foundation composition with the acid composition to obtain the candy precursor composition.

2. The process as claimed in claim 1, wherein the foundation composition and the acid composition are contacted in a weight ratio from 1:2 to 2:1.

3. The process as claimed in claim 1, wherein the foundation composition comprises a polysaccharide, the polysaccharide content of the foundation composition being at least 10% by weight above a polysaccharide content in the acid composition.

4. The process as claimed in claim 1, wherein the acid composition comprises an acid, the acid content of the acid composition being at least 10% by weight above an acid content of the foundation composition.

5. The process as claimed in claim 1, wherein the foundation composition has a foundation composition viscosity and the acid composition has an acid composition viscosity, the foundation composition viscosity being in a range from 50 to 150% of the acid composition viscosity.

6. The process as claimed in claim 1, wherein, in process step a), the candy precursor composition comprises a polysaccharide in a range from 1.2 to 2.5% by weight, based on the weight of the candy precursor composition.

7. The process as claimed in claim 1, wherein, in process step a), the candy precursor composition comprises a polypeptide in a range from 1 to 10% by weight, based on the weight of the candy precursor composition.

8. The process as claimed in claim 1, wherein the candy precursor composition is characterized by a pH in a range from 3.0 to 4.5.

9. A process comprising as steps
A. providing a device comprising a nozzle which comprises an outlet opening and a candy precursor composition, the candy precursor composition being characterized by a water content in a range from 15 to 24% by weight, based on the candy precursor composition, the nozzle
    a. being arranged above a substrate, and
    b. being designed and arranged such that the outlet opening can be moved to any point of a three-dimensional working volume above the substrate,
wherein the device further comprises
    i) a mixing chamber having a fluid-conducting connection to the outlet opening on the nozzle side before the outlet opening;
    ii) a first container having a fluid-conducting connection to the mixing chamber, the first container comprising a base composition; and
    iii) a further container having a fluid-conducting connection to the mixing chamber, the further container comprising an acid composition with a water content in a range from 3 to 45% by weight, based on the total weight of the acid composition; and
B. producing a candy from the candy precursor composition using the device.

10. A process for producing a candy, the process comprising as process steps
a) providing a candy precursor composition characterized by a water content in a range from 15 to 24% by weight, based on the candy precursor composition; and
b) shaping the candy precursor composition by a nozzle having an outlet opening by overlaying a substrate with the candy precursor composition to obtain a shaped article, the outlet opening of the nozzle traveling a three-dimensional trajectory;
wherein providing the candy precursor composition in process step a) comprises the substeps:
A) providing a foundation composition;
B) providing an acid composition; and
C) contacting the foundation composition with the acid composition at a temperature in the range from 15 to 55° C. to obtain the candy precursor composition.

\* \* \* \* \*